United States Patent
Darwish (10) Patent No.: US 12,308,894 B2
(45) Date of Patent: May 20, 2025

(54) SYSTEM, METHOD, AND MEDIUM FOR BLOCKCHAIN-ENABLED MICROWAVE ANTENNAS

(71) Applicant: RAKUTEN SYMPHONY, INC., Tokyo (JP)

(72) Inventor: Ahmed Darwish, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/006,948

(22) PCT Filed: Oct. 28, 2022

(86) PCT No.: PCT/JP2022/040544
§ 371 (c)(1),
(2) Date: Jan. 26, 2023

(87) PCT Pub. No.: WO2024/089899
PCT Pub. Date: May 2, 2024

(65) Prior Publication Data
US 2024/0250759 A1    Jul. 25, 2024

(51) Int. Cl.
*H04B 17/10* (2015.01)
*H01Q 3/00* (2006.01)
(Continued)

(52) U.S. Cl.
CPC ........... *H04B 17/12* (2015.01); *H04B 17/104* (2015.01); *H04B 17/191* (2023.05); *H01Q 1/125* (2013.01)

(58) Field of Classification Search
CPC ........ H01Q 1/00; H01Q 1/125; H01Q 1/1257; H01Q 3/00; H01Q 3/02; H01Q 3/08;
(Continued)

(56) References Cited

U.S. PATENT DOCUMENTS

| | | | | |
|---|---|---|---|---|
| 2004/0108963 A1* | 6/2004 | Clymer | .............. | H01Q 21/0037 343/837 |
| 2013/0239863 A1* | 9/2013 | Wiggins | ................... | H01Q 1/34 114/244 |
| 2015/0357710 A1* | 12/2015 | Li | ........................ | H01Q 21/065 342/174 |

OTHER PUBLICATIONS

Abdulwahab, Mortada M. et al., Design of Wireless Automatic Microwave Antenna Alignment System, International Journal of Electrical Engineering and Applied Sciences (JEEAS), vol. 3, No. 1, Penerbit Universiti Teknikal Malaysia Melaka Press, Apr. 29, 2020, pp. 15-19. (Year: 2020).*

(Continued)

*Primary Examiner* — Thai Pham
(74) *Attorney, Agent, or Firm* — Sughrue Mion, PLLC (57) ABSTRACT

A method for connecting microwave antennas to a blockchain network includes obtaining first positional data of the first microwave antenna, obtaining second positional data of the second microwave antenna, setting a first alignment position based on the first positional data, and a setting second alignment position based on the second positional data, positioning the first microwave antenna according to the first alignment position, positioning the second microwave antenna according to the second alignment position, measuring a received signal level (RSL) corresponding to a signal level between the first and second microwave antennas while the antennas are aligned according to the first and second alignment positions, comparing, the measured RSL to a predetermined RSL corresponding to an acceptable signal level, and determining that the first and second alignment positions correspond to at least an acceptable signal level between the first and second microwave antennas when the measured RSL is greater than the predetermined RSL.

17 Claims, 4 Drawing Sheets

(51) Int. Cl.
  *H04B 17/12* (2015.01)
  *H04B 17/15* (2015.01)
  *H01Q 1/12* (2006.01)

(58) Field of Classification Search
  CPC ...... H04B 17/10; H04B 17/12; H04B 17/101; H04B 17/104; H04B 17/191
  See application file for complete search history.

(56) References Cited

OTHER PUBLICATIONS

Chen, Zhonglin et al., A Security Authentication Scheme of 5G Ultra-Dense Network Based on Block Chain, IEEE Access, Sep. 23, 2018, vol. 6, pp. 55372-55379. (Year: 2018).*

Bala, R et al., Blockchain based Secure and Effective Authentication Mechanism for 5G Networks, 2022 IEEE International Conference on Blockchain and Distributed Systems Security (CBDS), Sep. 16, 2022, pp. 1-6. (Year: 2022).*

Mortada M. Abdulwahab et al., "Design of Wireless Automatic Microwave Antenna Alignment System", International Journal of Electrical Engineering and Applied Sciences(IJEEAS), 2020, pp. 15-19, vol. 3, No. 1, Online, Retrieved on Dec. 22, 2020, URL:https://core.ac.uk/dawnload/327208816.pdf.

Zhonglin Chen et al., "A Security Authentication Scheme of 5G Ultra-Dense Network Based on Block Chain", IEEE Access, 2018, pp. 55372-55379, vol. 6.

Bala, R et al., "Blockchain based Secure and Effective Authetication Mechanism for 5G Networks", 2022 IEEE International Conference on Blackchain and Distributed Systems Security (ICBDS), 2022, pp. 1-6.

International Search Report of PCT/JP2022/040544 dated Jan. 10, 2023 [PCT/ISA/210].

Written Opinion of PCT/JP2022/040544 dated Jan. 10, 2023 [PCT/ISA/237].

* cited by examiner

| | Antenna A Vertical Degree | Antenna A Horizontal Degree | Antenna A Elevation (cm) | Link RSL Value (dBm) | Antenna B Vertical Degree | Antenna B Horizontal Degree | Antenna B Elevation (cm) |
|---|---|---|---|---|---|---|---|
| Initial record | 95 | 40 | 3500 | 40dBm | 85 | 120 | 4000 |
| Best RSL | 96 | 41 | 3510 | 32dBm | 84.5 | ... | 4020 |
| | 94 | 39 | 3505 | 35dBm | | | 4025 |

FIG. 4

SYSTEM, METHOD, AND MEDIUM FOR BLOCKCHAIN-ENABLED MICROWAVE ANTENNAS

CROSS REFERENCE TO RELATED APPLICATIONS

This application is a National Stage of International Application No. PCT/JP2022/040544 filed on Oct. 28, 2022.

TECHNICAL FIELD

The present disclosure relates generally to the field of mobile data networks, and in particular to the alignment of microwave antennas.

BACKGROUND

Microwave transmission devices, such as microwave antennas, are at endpoints in a communication network and transmit data wirelessly between separate network segments and/or between separate networks. These devices transmit information between two points using beams of electromagnetic energy in a line-of-sight, that is, the electromagnetic beams are transmitted in a straight line between microwave antennas.

Misalignment of two microwave antennas can weaken the transmission signal between them. A weakened transmission signal can result in dropped data connections, which can put a strain on other network hardware and frustrate network users. Misalignment can occur as a result of improper initial alignment or from other causes such as weather, natural disasters, or foreign objects striking the antennas. If the antennas become misaligned, teams of engineers must be sent to the sites to re-align the antennas.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the connection of a first feature to a second feature in the description that follows may include embodiments in which the first and second features are directly connected, and may also include embodiments in which additional features may be connected between the first and second features, such that the first and second features may not be in direct connection. In addition, the present disclosure may repeat reference numerals and/or letters in the various examples. This repetition is for the purpose of simplicity and clarity and does not in itself dictate a relationship between the various embodiments and/or configurations discussed.

Alignment of microwave data links helps to maintain network integrity and performance. A reliable and fast network provides users with an enjoyable experience. Networks that drop connections and have low data rates can frustrate network users, which can result in cancellation of network service contracts, for example. Microwave antennas that are in proper alignment achieve a higher signal level, which in turn results in higher data throughput between the antennas. Further, microwave antennas that are able to quickly realign after being taken out of alignment can help to increase network integrity and robustness. Some approaches rely on two teams of engineers, one team for the setup and alignment of a first microwave antenna and the second team for set up and alignment of a second antenna to produce a data connection between the first and second antennas. In this approach, the teams must coordinate with each other as they each move the microwave antennas to attempt to align them. Each time an antenna is moved, the signal must be measured by at least one of the teams. If the signal is not sufficiently strong, the teams must continue moving the antennas, measuring signal level, and confirming the measurements with the other team. This process is repeated any time the antennas fall out of alignment.

In contrast, a system for microwave antenna alignment that employs a blockchain network and Artificial Intelligence (A.I.) for position determination and alignment of the microwave antennas, is capable of self-aligning and executing re-alignment when the antennas fall out of alignment, without the need for calling an engineering team to the antenna sites after every incident of misalignment.

In this application, microwave antennas are not aligned (or mis-aligned) when a received signal level (RSL) between antennas is below an acceptable predetermined threshold. The RSL can be measured, for example, in decibels per milliwatt (dBm). In some embodiments, the system takes measurements associated with the positing of at least one of the microwave antennas and measures an RSL associated with that position. Position data and the associated RSL is stored in a computer memory and compared with measured RSLs for different positions of the antenna in an attempt to find an RSL that is sufficient for acceptable data transfer using the microwave antenna. In some embodiments, antenna positional data is obtained using sensors connected to the antennas. In some embodiments, antenna positional data includes one or more of antenna latitude, antenna longitude, antenna vertical degree (e.g., vertical angle measured in degrees), or antenna horizontal degree (e.g., horizontal angle measured in degrees). An acceptable RSL depends on the specifications of individual networks and/or network equipment, for example, an acceptable RSL may range from −40 dBm to −35 dBm. Other acceptable RSLs may be higher or lower depending on the specifications of individual networks and/or network equipment. Once an acceptable RSL is achieved between the antennas, the position data is set and the antenna positions are locked. If the antennas come out of alignment, that is, when the measured RSL is less than a predetermined RSL, the antennas will repeat the automatic alignment process until the measured RSL is greater than or equal to the predetermined RSL representing an acceptable RSL between the antennas. In some embodiments, positioning of the microwave antennas is carried out using a motor. In some embodiments, an antenna may include one or more motors. In some embodiments, the motor is a 2-axis motor. In some embodiments, the motor used is other than a 2-axis motor. In some embodiments, a controllable device other than a motor, sufficient for positioning the antenna, may be used.

In some embodiments, an A.I. module nominates a single team of installation engineers for the initial setup of the microwave antennas. Installation, setup, and alignment of two microwave antennas is possible with one team working with one antenna at a time. In some embodiments, the A.I. module uses a decision tree algorithm to nominate an installation team sufficiently close to a predetermined installation site of a microwave antenna. In some embodiments, the A.I. module may apply a K-Nearest Neighbors (KNN) algorithm. In some embodiments, the A.I. module may apply a different decision tree algorithm. In some embodiments, the A.I. module may apply an algorithm other than a decision tree algorithm.

In some embodiments, once two microwave antennas are set up as network links, and before the antennas join the blockchain network, the A.I. module broadcasts to the blockchain network that two new links will be installed. In some embodiments, the A.I. module will provide an estimated time for completion of the installation. In some embodiments, the A.I. module applies a DeepETA algorithm. In some embodiments, the A.I. module applies an algorithm other than the DeepETA algorithm for estimation of installation time.

In some embodiments, once the two antennas are installed and set up as network links, the A.I. module calculates initial positions for each antenna and then sets additional positions for the antennas to be used in an alignment process. The A.I. module directs motors in the two antennas to set the antenna positions to the calculated positions, and at each position, an RSL is measured between the two antennas. In some embodiments, the A.I. module predicts an optimal RSL. In some embodiments, the A.I. module selects an optimal RSL from a database of stored measured RSL values which are taken at each antenna position during the alignment process. In some embodiments, the A.I. module applies a deep learning algorithm such as Recurrent Neural Network (RNN) learning to select and/or predict an optimal RSL. In some embodiments, the A.I. module applies a Long Term Short Term Memory (LSTM) based RNN algorithm to select and/or predict an optimal RSL. In some embodiments, the A.I. module applies an algorithm other than an RNN algorithm to select and/or predict an optimal RSL.

In some embodiments, data transmission microwave antenna links on the blockchain network are classified and/or prioritized by the A.I. module according to a classification algorithm. In some embodiments, the A.I. module classifies and/or prioritizes transmission links based on traffic, capacity and/or link importance using the classification algorithm. In some embodiments, preferred and alternative microwave link paths are determined using the A.I. module's classification algorithm.

In some embodiments, new blocks on the blockchain network are created which correspond to the microwave antennas that are installed and connected to the network. In some embodiments, the new blocks are created using a consensus method. The consensus method is based on the concept that existing network participants have already gained permission to be part of the network and that the participants involved in a transaction are able to confirm the transaction. Master nodes on the blockchain network act as administrators that grant permissions to other nodes joining the network. These master nodes may be selected based on hardware configuration and/or type (RAM, CPU, memory). For example, a device with more powerful hardware and/or more memory may be more likely to be selected as a master node. In some embodiments, selective endorsement is applied as the consensus method, using smart contracts to distributed ledgers in the blockchain network. That is, in some embodiments, the consensus method approves the adding of the blocks to the network that represent the microwave links, and information associated with the microwave links is distributed throughout the blockchain network using smart contracts to distributed ledgers in the network. In some embodiments, a smart contract includes program code stored in the blockchain that runs when a certain predetermined condition is met. In some embodiments, a smart contract can be triggered when a new node (e.g., a new microwave antenna link) is connected to the network. In some embodiments, when the smart contract is triggered, data associated with the new node is distributed to other nodes on the network and the data is recorded to distributed ledgers. In some embodiments, a smart contract is triggered in response to a change in the network such as having a node switched on or off, a node going down, and/or a change in configuration of a node. In some embodiments, a smart contract is triggered based on a time schedule, such as network updates being conducted every ten minutes and the like. In some embodiments, a distributed ledger is a database that is shared and synchronized across all nodes on the blockchain network. In some embodiments, distributed ledgers are accessible by all nodes, including master (admin) nodes, which verify data recorded in the distributed ledgers. In some embodiments, distributed ledgers store data such as link design, antenna configuration, antenna location, position and direction of an antenna, link status, link alarms, and the like.

Figure 1:
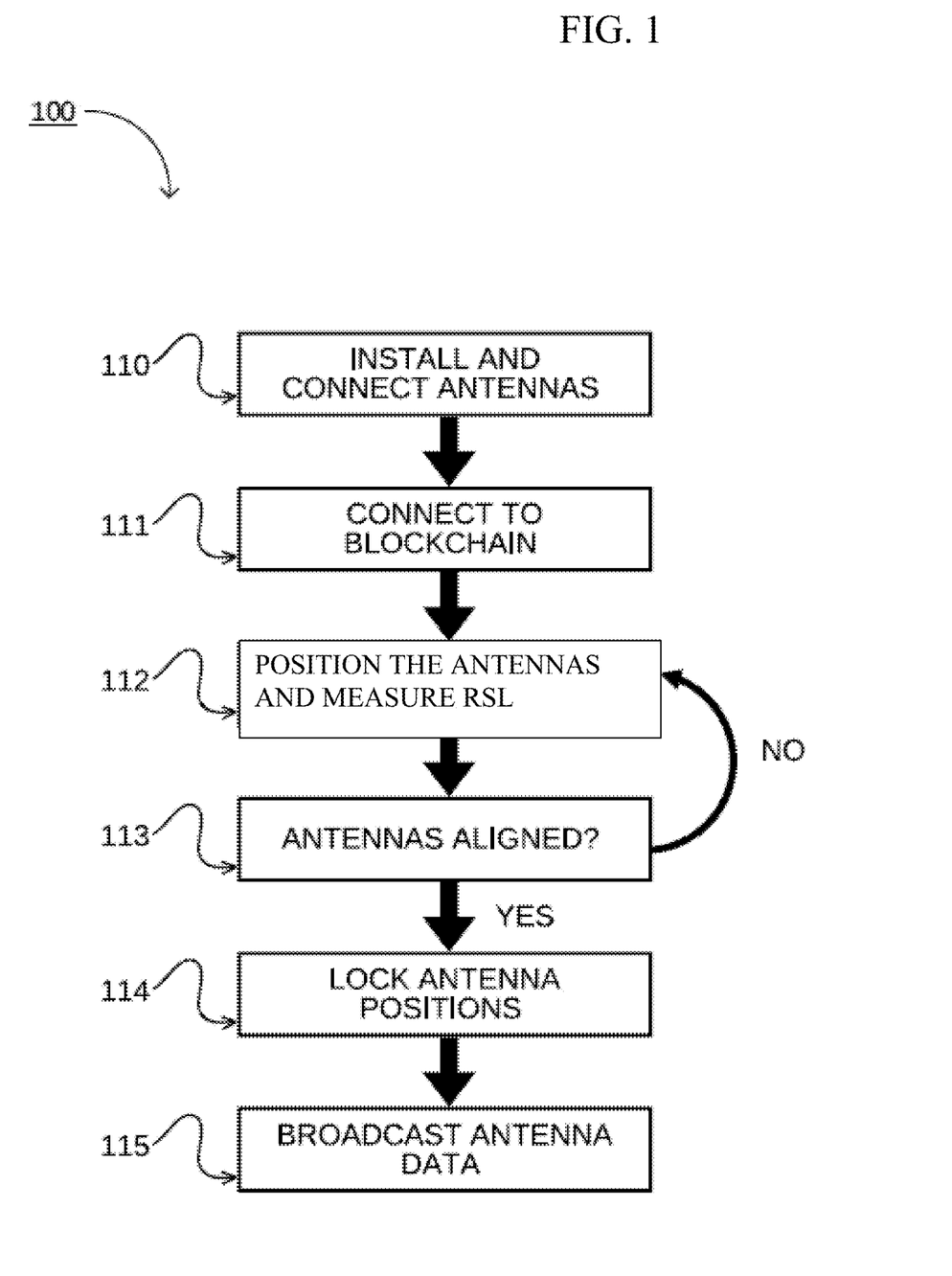
FIG. 1 is a flowchart of a method related to the installation and alignment of blockchain-enabled microwave antennas in accordance with some embodiments.

FIG. 1 is a flowchart of a method 100 for the installation and alignment of blockchain-enabled microwave antennas in accordance with some embodiments. Method 100 employs blockchain and A.I. technology so that a single installation team can install two microwave antennas that automatically align with each other and automatically maintain alignment. This helps the microwave links in a network maintain robust connections with high data throughput. Further, the antennas are able to realign automatically in the event of misalignment. Each microwave antenna is treated as a block on the blockchain, and all antennas on the blockchain network are able to share data associated with positioning, location, alignment and the like.

In operation 110, a first microwave antenna is installed to a predetermined site location and connected to the internet by a technician team. In some embodiments, the first microwave antenna connects to a network other than the internet, such as a private network or a private blockchain network. After installing the first antenna and connecting the antenna to a network, the technician team travels to a second predetermined site location, different from the first predetermined site location, to set up the second microwave antenna. The second microwave antenna is installed to the second site location and connected to the internet by the technician team. In some embodiments, the second microwave antenna connects to a network other than the internet, such as a private network or a private blockchain network. In some embodiments, the first and second microwave antenna each have a unique network address.

In operation 111, the first and second microwave antennas connect to a blockchain network. Other nodes on the blockchain network are configured to authenticate the first and second microwave antennas, and authorize the antennas as new nodes on the blockchain network. In some embodiments, the first and second microwave antennas each have a unique private key that is used to connect to the blockchain network. Once the first microwave antenna is connected to the blockchain network, it downloads blockchain data including, but not limited to ledgers and network transactions. In some embodiments, the first microwave antenna downloads all available blockchain data on the network including ledgers and all transactions. Once the second microwave antenna is connected to the blockchain network, it downloads blockchain data including, but not limited to, ledgers and network transactions. In some embodiments, the second microwave antenna downloads all available blockchain data on the network including ledgers and all transactions. In some embodiments, while the first and second microwave antennas are connected to the blockchain network, each antenna collects real-time data via sensors including positional data including, but not limited to, latitude of the antenna, longitude of the antenna, altitude of the antenna, vertical angle of the antenna, and horizontal angle of the antenna. In some embodiments, the data is not collected in real-time. In some embodiments, vertical and horizontal angle are measured relative to the Earth. In some embodiments, vertical and horizontal angle are measured relative to reference axes other than the Earth. In some embodiments, the sensors are installed on the antennas. In some embodiments, the sensors are not installed on the antennas. In some embodiments, the collected data is broadcast to the blockchain network. In some embodiments, the collected data is broadcast to the blockchain network after new blocks representing the first and the second microwave antennas are created. In some embodiments, the new blocks are created using a consensus process. In some embodiments, the new blocks are created using selective endorsement and through smart contracts to all distributed ledgers in the blockchain network. In some embodiments, the first and second microwave antennas store data indicating that the first and second antennas are part of the same network link, and they each know the other's positional information including latitude, longitude, altitude, vertical angle, and horizontal angle. In some embodiments, the first and second antennas are in line of sight (LoS) with each other.

In operation 112, an A.I. module determines initial positions for the first and second microwave antennas using a positioning algorithm to generate position and direction parameters. The position and direction parameters are uploaded to the blockchain network and made accessible to the first and second microwave antennas. The first and second microwave antennas download the positioning data and apply the parameters thereby adjusting their positioning. In some embodiments, the antenna positions are adjusted using at least one motor attached to each of the first and second microwave antennas. In some embodiments, the motors are 2-axis motors. In some embodiments, the motors are other than 2-axis motors. In some embodiments, the antennas are adjusted using means other than motors. Once the first and second microwave antennas are set to their respective initial positions, an initial received signal level (RSL) is obtained by either or both of the first and second microwave antennas and automatically stored in a memory. In some embodiments, the initial RSL is recorded in both directions. The initial RSL is compared with a predetermined RSL. The predetermined RSL corresponds to a link design value that is set based, in part, on performance parameters of the microwave link.

In operation 113, the initial RSL is compared with the predetermined RSL. If the initial RSL is determined to be greater than or equal to the predetermined RSL, operation 114 is carried out. If the initial RSL is determined to be less than the predetermined RSL, operations 112 and 113 are carried out until a measured RSL is greater than or equal to the predetermined RSL.

In operation 114, upon a determination that the initial RSL is greater than or equal to the predetermined RSL, the positions of the first and second microwave antennas corresponding to the initial RSL are fixed in place.

In operation 115, the positions of the fixed first and second microwave antennas corresponding to the initial RSL being greater than or equal to the predetermined RSL are broadcast to the blockchain network. In some embodiments, operation 115 is optional.

Figure 2:
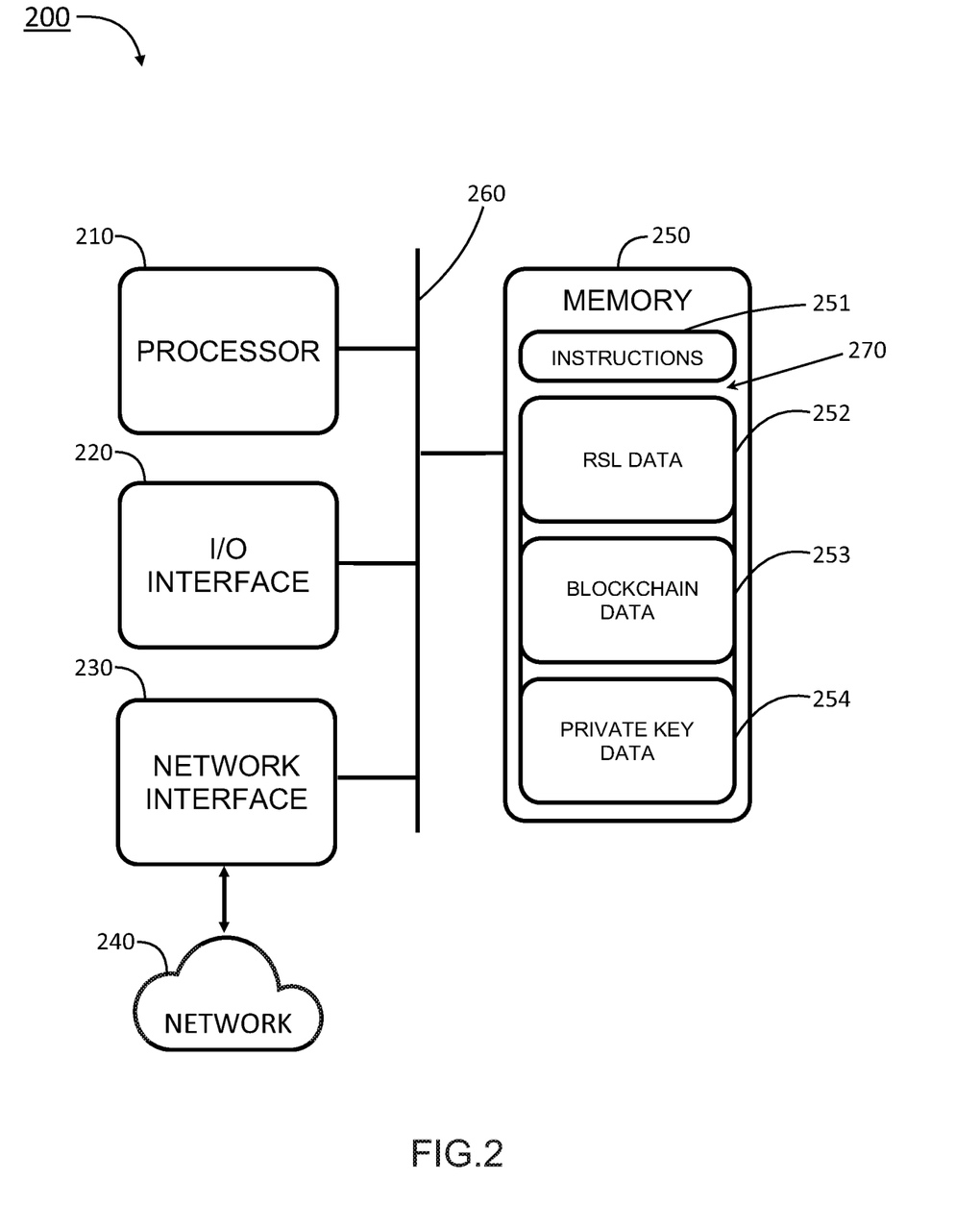
FIG. 2 is a block diagram of a system including a non-transitory computer readable medium for implementing a method related to the installation and alignment of blockchain-enabled microwave antennas, in accordance with some embodiments.

FIG. 2 is a block diagram of a system 200 including a non-transitory computer readable medium 250 for implementing a method related to the installation and alignment of blockchain-enabled microwave antennas, in accordance with some embodiments. In some embodiments, system 200 implements method 100. System 200 includes a hardware processor 210 and a non-transitory, computer readable storage medium 250 encoded with, (i.e., storing), the computer program code 270, (i.e., a set of executable instructions). Computer readable storage medium 250 is also encoded with instructions 251 for interfacing with different devices within a network. The processor 210 is electrically coupled to the computer readable storage medium 250 via a bus 260. The processor 210 is also electrically coupled to an I/O interface 220 by bus 260. A network interface 230 is also electrically connected to the processor 210 via bus 260. Network interface 230 is connected to a network 240, so that processor 210 and computer readable storage medium 250 are capable of connecting to external elements via network 240. The processor 210 is configured to execute the computer program code 270 encoded in the computer readable storage medium 250 in order to cause system 200 to be usable for performing a portion or all of the operations as described in method 100.

In some embodiments, the processor 210 is a central processing unit (CPU), a multi-processor, a distributed processing system, an application specific integrated circuit (ASIC), and/or a suitable processing unit.

In some embodiments, the computer readable storage medium 250 is an electronic, magnetic, optical, electromagnetic, infrared, and/or a semiconductor system (or apparatus or device). For example, the computer readable storage medium 250 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 250 includes a compact disk-read only memory (CD-ROM), a compact disk-read/write (CD-R/W), and/or a digital video disc (DVD).

In some embodiments, the storage medium 250 stores the computer program code 270 configured to cause system 200 to perform method 100. In some embodiments, the storage medium 250 also stores information needed for performing a method 100 as well as information generated during performing the method 100, such as RSL data 252, hashed blockchain data 253, and private key data 254 and/or a set of executable instructions to perform the operation of method 100.

In some embodiments, the storage medium 250 stores instructions 251 for interfacing with external components within the network. The instructions 251 enable processor 210 to generate instructions readable by the external components to effectively implement method 100.

System 200 includes I/O interface 220. I/O interface 220 is coupled to external circuitry. In some embodiments, I/O interface 220 includes a keyboard, keypad, mouse, trackball, trackpad, and/or cursor direction keys for communicating information and commands to processor 210.

System 200 also includes network interface 230 coupled to the processor 210. Network interface 230 allows system 200 to communicate with network 240, to which one or more other computer systems are connected. Network interface 230 includes wireless network interfaces such as BLUETOOTH, WIFI, WIMAX, GPRS, or WCDMA; or wired network interface such as ETHERNET, USB, or IEEE-1394. In some embodiments, method 100 is implemented in two or more systems 200, and information such as memory type, memory array layout, I/O voltage, and I/O pin location are exchanged between different systems 200 via network 240.

Figure 3:
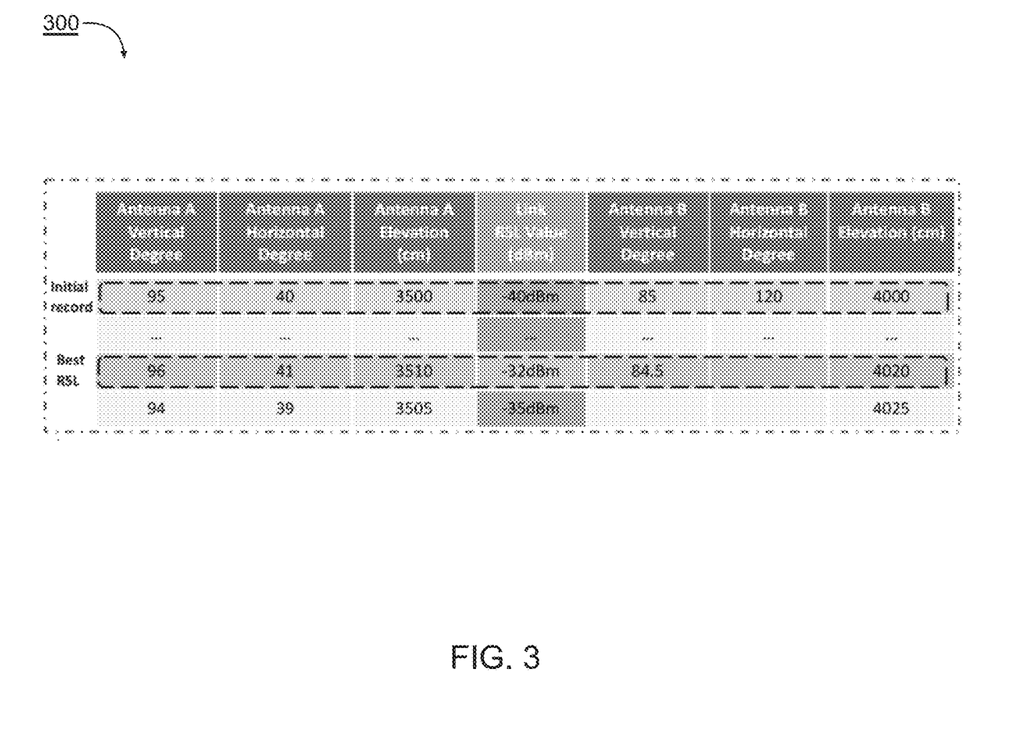
FIG. 3 is a block diagram of a system in accordance with some embodiments.
Figure 4:
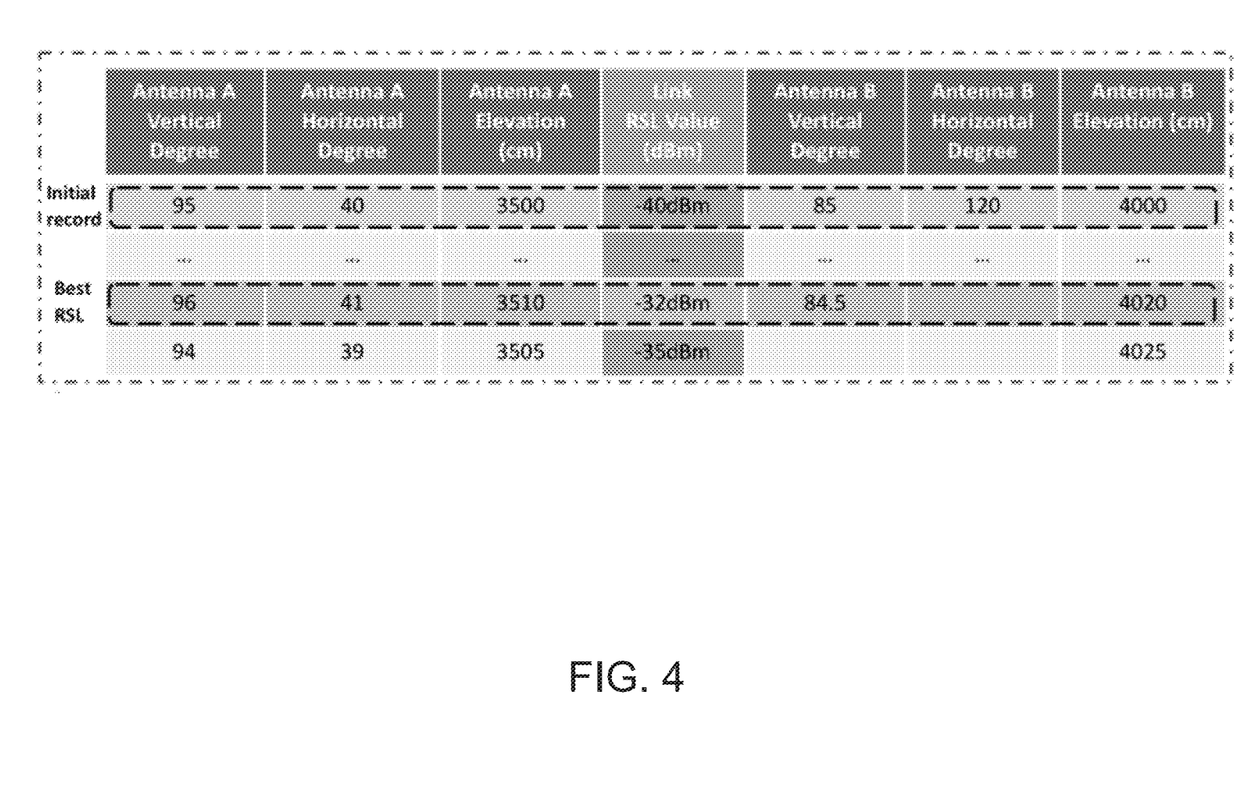
FIG. 4 is a table of an exemplary representation, according to some embodiments, of stored data associated with antenna positioning and RSL. In some embodiments, either a portion or all of this data is broadcast to a blockchain network.

FIG. 3 is block diagram of the system 200 which includes the network 240 being communicable with the first microwave antenna 301 and the second microwave antenna 302, the blockchain network 303, the at least one motor 311 provided within the first microwave antenna and the at least one motor 312 provided in the second microwave antenna, and the A.I. module 304.

An aspect of this disclosure relates to a system system with a memory that stores instructions, and at least one processor configured by the instructions to perform operations that include connecting a first microwave antenna and a second microwave antenna to a blockchain network, where the first microwave antenna and the second microwave antenna each have at least one motor. The system further obtains, using the first microwave antenna, first positional data associated with the first microwave antenna and also obtains, using the second microwave antenna, second positional data associated with the second microwave antenna. The system further sets, using an artificial intelligence (A.I.) module, a first alignment position based on the first positional data, and a second alignment position based on the second positional data. The system further positions the first microwave antenna according to the first alignment position, using the at least one motor of the first microwave antenna. The system further positions the second microwave antenna according to the second alignment position, using the at least one motor of the second microwave antenna. The system further measures a received signal level (RSL) corresponding to a signal level between the first and second microwave antennas, using the first microwave antenna or the second microwave antenna, while the antennas are aligned according to the first and second alignment positions. The system further compares the measured RSL to a predetermined RSL corresponding to an acceptable signal level, using the A.I. module. The system further determines that the first and second alignment positions correspond to at least an acceptable signal level between the first and second microwave antennas, using the A.I. module, when the measured RSL is greater than or equal to the predetermined RSL. In some embodiments, the operation of connecting the first microwave antenna and the second microwave antenna to the blockchain network include connecting the first microwave antenna and the second microwave antenna to the Internet, automatically connecting, using a first private key and a second private key, the first microwave antenna and the second microwave antenna to the blockchain network in response to connecting the first and second microwave antennas to the Internet, automatically authenticating and authorizing, in response to connecting to the blockchain network, using the first private key and the second private key, the first microwave antenna and the second microwave antenna as a first node and a second node, respectively, of the blockchain network, and automatically downloading from the blockchain network, by the first microwave antenna or the second microwave antenna, data, ledgers, and transactions associated with the blockchain network. In some embodiments, the operations further include broadcasting, to the blockchain network, the first positional data and the second positional data using smart contracts and distributed ledgers, in which the first node and the second node on the blockchain network are created using a consensus process, the first positional data includes a first latitude, a first longitude, a first altitude, a first vertical position, and a first horizontal position associated with the first microwave antenna, and the second positional data includes a second latitude, a second longitude, a second altitude, a second vertical position, and a second horizontal position associated with the second microwave antenna. In some embodiments, the operations further include determining, using the A.I. module, third positional data including a third latitude, a third longitude, a third altitude, a third vertical position, and a third horizontal position associated with the first microwave antenna, in which the third positional data corresponds to a target position of the first microwave antenna that is different from the first positional data, and the A.I. module further determines fourth positional data including a fourth latitude, a fourth longitude, a fourth altitude, a fourth vertical position, and a fourth horizontal position associated with the second microwave antenna, in which the fourth positional data corresponds to a target position of the second microwave antenna that is different from the second positional data. In some embodiments, the operations further include transferring, using at least one smart contract, the first positional data, the second positional data, the third positional data, and the fourth positional data to both the first microwave antenna and the second microwave antenna, positioning the first antenna, using at the at least one motor of the first microwave antenna, according to the third positional data, and positioning the second antenna, using at the at least one motor of the second microwave antenna, according to the fourth positional data. In some embodiments, the operations further include obtaining, using the first microwave antenna or the second microwave antenna, a second measured RSL corresponding to a signal level of a network link between the first microwave antenna and the second microwave antenna, where the signal level corresponds to the third and fourth positional data, storing, in a computer memory, the second measured RSL in association with the third positional data, and the fourth positional data, and comparing the stored second measured RSL with the predetermined RSL to determine whether the first and second microwave antennas are in alignment. In some embodiments, when the second measured RSL is greater than or equal to the predetermined RSL, the first microwave antenna and the second microwave antenna are determined to be in alignment, when the second measured RSL is less than the predetermined RSL, the first microwave antenna and the second microwave antenna are determined to be out of alignment, and the A.I. module continuously repositions and measures the RSL between the first and second microwave antennas until a measured RSL is greater than or equal to the predetermined RSL, and when the measured RSL is greater than the predetermined RSL, the positions of the first and second microwave antennas associated with the measured RSL are fixed and the first and second antennas are determined to be in alignment. I'm some embodiments, once the first and second antennas are in alignment and fixed, the measured RSL of the aligned antennas and the positional data for each antenna are uploaded to the blockchain network and made accessible to other nodes on the network, some of which may be other microwave antennas.

An aspect of this disclosure relates to a method for alignment of microwave antennas in which a first microwave antenna and a second microwave antenna are connected to a blockchain network, where the first microwave antenna includes at least one motor, and the second microwave antenna also includes at least one motor. The method includes obtaining, using the first microwave antenna, first positional data of the first microwave antenna, obtaining, using the second microwave antenna, second positional data of the second microwave antenna, setting, using an artificial intelligence (A.I.) module, a first alignment position based on the first positional data, and a second alignment position based on the second positional data, positioning, using the at least one motor of the first microwave antenna, the first microwave antenna according to the first alignment position, positioning, using the at least one motor of the second microwave antenna, the second microwave antenna according to the second alignment position, measuring, using the first microwave antenna or the second microwave antenna, a received signal level (RSL) corresponding to a signal level between the first and second microwave antennas while the antennas are aligned according to the first and second alignment positions, comparing, using the A.I. module, the measured RSL to a predetermined RSL corresponding to an acceptable signal level, and determining, using the A.I. module, that the first and second alignment positions correspond to at least an acceptable signal level between the first and second microwave antennas when the measured RSL is greater than the predetermined RSL. In some embodiments, connecting the first microwave antenna and the second microwave antenna to the blockchain network includes connecting the first microwave antenna and the second microwave antenna to the Internet, automatically connecting, in response to connecting to the Internet, using a first private key and a second private key, the first microwave antenna and the second microwave antenna to the blockchain network, automatically authenticating and authorizing, in response to connecting to the blockchain network, using the first private key and the second private key, the first microwave antenna and the second microwave antenna as a first node and a second node, respectively, of the blockchain network, and automatically downloading from the blockchain network, by the first microwave antenna or the second microwave antenna, data, ledgers, and transactions associated with the blockchain network. In some embodiments, the method further includes broadcasting, to the blockchain network, the first positional data and the second positional data using smart contracts and distributed ledgers, where the first node and the second node on the blockchain network are created using a consensus process, the first positional data includes a first latitude, a first longitude, a first altitude, a first vertical position, and a first horizontal position associated with the first microwave antenna, and the second positional data includes a second latitude, a second longitude, a second altitude, a second vertical position, and a second horizontal position associated with the second microwave antenna. In some embodiments, the method further includes determining, using the A.I. module, third positional data including a third latitude, a third longitude, a third altitude, a third vertical position, and a third horizontal position associated with the first microwave antenna, in which the third positional data corresponding to a target position of the first microwave antenna is different from the first positional data, and determining, using the A.I. module, fourth positional data including a fourth latitude, a fourth longitude, a fourth altitude, a fourth vertical position, and a fourth horizontal position associated with the second microwave antenna, in which the fourth positional data corresponds to a target position of the second microwave antenna that is different from the second positional data. In some embodiments, the method further includes transferring, using at least one smart contract, the first positional data, the second positional data, the third positional data, and the fourth positional data to both the first microwave antenna and the second microwave antenna, positioning the first antenna, using at the at least one motor of the first microwave antenna, according to the third positional data, and positioning the second antenna, using at the at least one motor of the second microwave antenna, according to the fourth positional data. In some embodiments, the method further includes obtaining, using the first microwave antenna or the second microwave antenna, a second measured RSL corresponding to a signal level of a network link between the first microwave antenna and the second microwave antenna, in which the signal level corresponds to the third and fourth positional data, storing, in a computer memory, the second measured RSL in association with the third positional data, and the fourth positional data, and comparing the stored second measured RSL with the predetermined RSL to determine whether the first and second microwave antennas are in alignment. In some embodiments, when the second measured RSL is greater than the predetermined RSL, the first microwave antenna and the second microwave antenna are determined to be in alignment, when the second measured RSL is less than the predetermined RSL, the first microwave antenna and the second microwave antenna are determined to be out of alignment, and the A.I. module continuously repositions and measures the RSL between the first and second microwave antennas until a measured RSL is greater than the predetermined RSL, and when the measured RSL is greater than the predetermined RSL, the positions of the first and second microwave antennas associated with the measured RSL are fixed and the first and second antennas are determined to be in alignment.

An aspect of this disclosure relates to a non-transitory computer readable medium storing instructions that, when executed by at least one processor, cause the at least one processor to perform operations including connecting a first microwave antenna and a second microwave antenna to a blockchain network, where the first and second microwave antennas each include at least one motor, obtaining, using the first microwave antenna, first positional data of the first microwave antenna, obtaining, using the second microwave antenna, second positional data of the second microwave antenna, setting, using an artificial intelligence (A.I.) module, a first alignment position based on the first positional data, and a second alignment position based on the second positional data, positioning, using the at least one motor of the first microwave antenna, the first microwave antenna according to the first alignment position, positioning, using the at least one motor of the second microwave antenna, the second microwave antenna according to the second alignment position, measuring, using the first microwave antenna or the second microwave antenna, a received signal level (RSL) corresponding to a signal level between the first and second microwave antennas while the antennas are aligned according to the first and second alignment positions, comparing, using the A.I. module, the measured RSL to a predetermined RSL corresponding to an acceptable signal level, and determining, using the A.I. module, that the first and second alignment positions correspond to at least an acceptable signal level between the first and second microwave antennas when the measured RSL is greater than the predetermined RSL. In some embodiments, the operation of connecting the first microwave antenna and the second microwave antenna to the blockchain network includes connecting the first microwave antenna and the second microwave antenna to the Internet, automatically connecting, in response to connecting to the Internet, using a first private key and a second private key, the first microwave antenna and the second microwave antenna to the blockchain network, automatically authenticating and authorizing, in response to connecting to the blockchain network, using the first private key and the second private key, the first microwave antenna and the second microwave antenna as a first node and a second node, respectively, of the blockchain network, and automatically downloading from the blockchain network, by the first microwave antenna or the second microwave antenna, data, ledgers, and transactions associated with the blockchain network. In some embodiments, the operations further include broadcasting, to the blockchain network, the first positional data and the second positional data using smart contracts and distributed ledgers, where the first node and the second node on the blockchain network are created using a consensus process, the first positional data includes a first latitude, a first longitude, a first altitude, a first vertical position, and a first horizontal position associated with the first microwave antenna, and the second positional data includes a second latitude, a second longitude, a second altitude, a second vertical position, and a second horizontal position associated with the second microwave antenna. In some embodiments, the operations further include determining, using the A.I. module, third positional data including a third latitude, a third longitude, a third altitude, a third vertical position, and a third horizontal position associated with the first microwave antenna, where the third positional data corresponds to a target position of the first microwave antenna that is different from the first positional data, and determining, using the A.I. module, fourth positional data including a fourth latitude, a fourth longitude, a fourth altitude, a fourth vertical position, and a fourth horizontal position associated with the second microwave antenna, where the fourth positional data corresponds to a target position of the second microwave antenna that is different from the second positional data. In some embodiments, the operations further include transferring, using at least one smart contract, the first positional data, the second positional data, the third positional data, and the fourth positional data to both the first microwave antenna and the second microwave antenna, positioning the first antenna, using at the at least one motor of the first microwave antenna, according to the third positional data, positioning the second antenna, using at the at least one motor of the second microwave antenna, according to the fourth positional data, obtaining, using the first microwave antenna or the second microwave antenna, a second measured RSL corresponding to a signal level of a network link between the first microwave antenna and the second microwave antenna, where the signal level corresponds to the third and fourth positional data, storing, in a computer memory, the second measured RSL in association with the third positional data, and the fourth positional data, and comparing the stored second measured RSL with the predetermined RSL to determine whether the first and second microwave antennas are in alignment. In some embodiments, when the second measured RSL is greater than the predetermined RSL, the first microwave antenna and the second microwave antenna are determined to be in alignment, when the second measured RSL is less than the predetermined RSL, the first microwave antenna and the second microwave antenna are determined to be out of alignment, and the A.I. module will continuously repositions and measures the RSL between the first and second microwave antennas until a measured RSL is greater than the predetermined RSL, and when the measured RSL is greater than the predetermined RSL, the positions of the first and second microwave antennas associated with the measured RSL are fixed and the first and second antennas are determined to be in alignment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A system for microwave antenna alignment comprising:
   a memory that stores instructions, and
   at least one processor configured by the instructions to perform operations comprising:
     connecting a first microwave antenna and a second microwave antenna to a blockchain network, wherein the first microwave antenna comprises at least one motor and the second microwave antenna comprises at least one motor;
     obtaining, using the first microwave antenna, first positional data of the first microwave antenna;
     obtaining, using the second microwave antenna, second positional data of the second microwave antenna;
     setting using an artificial intelligence (A.I.) module, a first alignment position based on the first positional data, and a second alignment position based on the second positional data;
     positioning, using the at least one motor of the first microwave antenna, the first microwave antenna according to the first alignment position;
     positioning using the at least one motor of the second microwave antenna, the second microwave antenna according to the second alignment position;
     measuring, using the first microwave antenna or the second microwave antenna, a received signal level (RSL) corresponding to a signal level between the first and second microwave antennas while the antennas are aligned according to the first and second alignment positions;

comparing using the A.I. module, the measured RSL to a predetermined RSL corresponding to an acceptable signal level; and determining, using the A.I. module, that the first and second alignment positions correspond to at least an acceptable signal level between the first and second microwave antennas when the measured RSL is greater than the predetermined RSLA, wherein the operation of connecting the first microwave antenna and the second microwave antenna to the blockchain network further comprises:

connecting the first microwave antenna and the second microwave antenna to the Internet;

automatically connecting, in response to connecting to the Internet, using a first private key and a second private key, the first microwave antenna and the second microwave antenna to the blockchain network;

automatically authenticating and authorizing, in response to connecting to the blockchain network, using the first private key and the second private key, the first microwave antenna and the second microwave antenna as a first node and a second node, respectively, of the blockchain network; and automatically downloading from the blockchain network, by the first microwave antenna or the second microwave antenna, data, ledgers, and transactions associated with the blockchain network.

2. The system for microwave antenna alignment of claim system of claim 1, wherein the operations further comprise:

broadcasting, to the blockchain network, the first positional data and the second positional data using smart contracts and distributed ledgers, wherein the first node and the second node on the blockchain network are created using a consensus process, the first positional data comprises: a first latitude, a first longitude, a first altitude, a first vertical position, and a first horizontal position associated with the first microwave antenna, and the second positional data comprises: a second latitude, a second longitude, a second altitude, a second vertical position, and a second horizontal position associated with the second microwave antenna.

3. The system for microwave antenna alignment of claim 2, wherein the operations further comprise:

determining, using the A.I. module, third positional data comprising: a third latitude, a third longitude, a third altitude, a third vertical position, and a third horizontal position associated with the first microwave antenna, the third positional data corresponding to a target position of the first microwave antenna different from the first positional data; and determining, using the A.I. module, fourth positional data comprising: a fourth latitude, a fourth longitude, a fourth altitude, a fourth vertical position, and a fourth horizontal position associated with the second microwave antenna, the fourth positional data corresponding to a target position of the second microwave antenna different from the second positional data.

4. The system for microwave antenna alignment of claim 3, wherein the operations further comprise:

transferring, using at least one smart contract, the first positional data, the second positional data, the third positional data, and the fourth positional data to both the first microwave antenna and the second microwave antenna;

positioning the first antenna, using at the at least one motor of the first microwave antenna, according to the third positional data; and positioning the second antenna, using at the at least one motor of the second microwave antenna, according to the fourth positional data.

5. The system for microwave antenna alignment of claim 4, wherein the operations further comprise:

obtaining, using the first microwave antenna or the second microwave antenna, a second measured RSL corresponding to a signal level of a network link between the first microwave antenna and the second microwave antenna, wherein the signal level corresponds to the third and fourth positional data;

storing, in a computer memory, the second measured RSL in association with the third positional data, and the fourth positional data; and comparing the stored second measured RSL with the predetermined RSL to determine whether the first and second microwave antennas are in alignment.

6. The system for microwave antenna alignment of claim 5, wherein when the second measured RSL is greater than or equals to the predetermined RSL, the first microwave antenna and the second microwave antenna are determined to be in alignment, when the second measured RSL is less than the predetermined RSL, the first microwave antenna and the second microwave antenna are determined to be out of alignment, and the A.I. module continuously repositions and measures the RSL between the first and second microwave antennas until a measured RSL is greater than or equal to the predetermined RSL, and when the measured RSL is greater than or equal to the predetermined RSL, the positions of the first and second microwave antennas associated with the measured RSL are fixed and the first and second antennas are determined to be in alignment.

7. A method for installation and alignment of blockchain-enabled microwave antennas comprising:

connecting a first microwave antenna and a second microwave antenna to a blockchain network, wherein the first microwave antenna comprises at least one motor and the second microwave antenna comprises at least one motor;

obtaining using the first microwave antenna, first positional data of the first microwave antenna;

obtaining, using the second microwave antenna, second positional data of the second microwave antenna;

setting, using an artificial intelligence (A.I) module, a first alignment position based on the first positional data, and a second alignment position based on the second positional data;

positioning, using the at least one motor of the first microwave antenna, the first microwave antenna according to the first alignment position;

positioning, using the at least one motor of the second microwave antenna, the second microwave antenna according to the second alignment position;

measuring, using the first microwave antenna or the second microwave antenna, a received signal level (RSL) corresponding to a signal level between the first and second microwave antennas while the antennas are aligned according to the first and second alignment positions;

comparing using the A.I. module, the measured RSL to a predetermined RSL corresponding to an acceptable signal level; and determining, using the A.I. module, that the first and second alignment positions correspond to at least an acceptable signal level between the first and second microwave antennas when the measured RSL is greater than the predetermined RSL, wherein connecting the first microwave antenna and the second microwave antenna to the blockchain network further comprises:

connecting the first microwave antenna and the second microwave antenna to the Internet;

automatically connecting, in response to connecting to the Internet, using a first private key and a second private key, the first microwave antenna and the second microwave antenna to the blockchain network;

automatically authenticating and authorizing, in response to connecting to the blockchain network, using the first private key and the second private key, the first microwave antenna and the second microwave antenna as a first node and a second node, respectively, of the blockchain network; and automatically downloading from the blockchain network, by the first microwave antenna or the second microwave antenna, data, ledgers, and transactions associated with the blockchain network.

8. The method for installation and alignment of blockchain-enabled microwave antennas of claim 7, further comprising:

broadcasting, to the blockchain network, the first positional data and the second positional data using smart contracts and distributed ledgers, wherein the first node and the second node on the blockchain network are created using a consensus process, the first positional data comprises: a first latitude, a first longitude, a first altitude, a first vertical position, and a first horizontal position associated with the first microwave antenna, and the second positional data comprises: a second latitude, a second longitude, a second altitude, a second vertical position, and a second horizontal position associated with the second microwave antenna.

9. The method for installation and alignment of blockchain-enabled microwave antennas of claim 8, further comprising:

determining, using the A.I. module, third positional data comprising: a third latitude, a third longitude, a third altitude, a third vertical position, and a third horizontal position associated with the first microwave antenna, the third positional data corresponding to a target position of the first microwave antenna different from the first positional data; and determining, using the A.I. module, fourth positional data comprising: a fourth latitude, a fourth longitude, a fourth altitude, a fourth vertical position, and a fourth horizontal position associated with the second microwave antenna, the fourth positional data corresponding to a target position of the second microwave antenna different from the second positional data.

10. The method for installation and alignment of blockchain-enabled microwave antennas of claim 9, further comprising:

transferring, using at least one smart contract, the first positional data, the second positional data, the third positional data, and the fourth positional data to both the first microwave antenna and the second microwave antenna;

positioning the first antenna, using at the at least one motor of the first microwave antenna, according to the third positional data; and positioning the second antenna, using at the at least one motor of the second microwave antenna, according to the fourth positional data.

11. The method of claim 10, further comprising:

obtaining, using the first microwave antenna or the second microwave antenna, a second measured RSL corresponding to a signal level of a network link between the first microwave antenna and the second microwave antenna, wherein the signal level corresponds to the third and fourth positional data;

storing, in a computer memory, the second measured RSL in association with the third positional data, and the fourth positional data; and comparing the stored second measured RSL with the predetermined RSL to determine whether the first and second microwave antennas are in alignment.

12. The method for installation and alignment of blockchain-enabled microwave antennas of claim 11, wherein when the second measured RSL is greater than or equal to the predetermined RSL, the first microwave antenna and the second microwave antenna are determined to be in alignment, when the second measured RSL is less than the predetermined RSL, the first microwave antenna and the second microwave antenna are determined to be out of alignment, and the A.I. module continuously repositions and measures the RSL between the first and second microwave antennas until a measured RSL is greater than or equal to the predetermined RSL, and when the measured RSL is greater than or equal to the predetermined RSL, the positions of the first and second microwave antennas associated with the measured RSL are fixed and the first and second antennas are determined to be in alignment.

13. A non-transitory computer readable medium for implementing a method related to the installation and alignment of blockchain-enabled microwave antennas, storing instructions that, when executed by at least one processor, cause the at least one processor to perform operations comprising:

connecting a first microwave antenna and a second microwave antenna to a blockchain network, wherein the first microwave antenna comprises at least one motor and the second microwave antenna comprises at least one motor;

obtaining, using the first microwave antenna, first positional data of the first microwave antenna, second obtaining using the second microwave antenna, second positional data of the microwave antenna;

setting, using an artificial intelligence (A.I.) module, a first alignment position based on the first positional data, and a second alignment position based on the second positional data;

positioning, using the at least one motor of the first microwave antenna the first microwave antenna according to the first alignment position;

positioning, using the at least one motor of the second microwave antenna, the second microwave antenna according to the second alignment position;

measuring, using the first microwave antenna or the second microwave antenna, a received signal level (RSL) corresponding to a signal level between the first and second microwave antennas while the antennas are aligned according to the first and second alignment positions;

comparing, using the A.I. module, the measured RSL to a predetermined RSL corresponding to an acceptable signal level; and determining using the A.I. module, that the first and second alignment positions correspond to at least an acceptable signal level between the first and second microwave antennas when the measured RSL is greater than the predetermined RSL, wherein the operation of connecting the first microwave antenna and the second microwave antenna to the blockchain network comprises:

connecting the first microwave antenna and the second microwave antenna to the Internet;

automatically connecting, in response to connecting to the Internet, using a first private key and a second private key, the first microwave antenna and the second microwave antenna to the blockchain network;

automatically authenticating and authorizing, in response to connecting to the blockchain network, using the first private key and the second private key, the first microwave antenna and the second microwave antenna as a first node and a second node, respectively, of the blockchain network; and automatically downloading from the blockchain network, by the first microwave antenna or the second microwave antenna, data, ledgers, and transactions associated with the blockchain network.

14. The non-transitory computer readable medium for implementing a method related to the installation and alignment of blockchain-enabled microwave antennas of claim 13, wherein the operations further comprise:

broadcasting, to the blockchain network, the first positional data and the second positional data using smart contracts and distributed ledgers, wherein the first node and the second node on the blockchain network are created using a consensus process, the first positional data comprises: a first latitude, a first longitude, a first altitude, a first vertical position, and a first horizontal position associated with the first microwave antenna, and the second positional data comprises: a second latitude, a second longitude, a second altitude, a second vertical position, and a second horizontal position associated with the second microwave antenna.

15. The non-transitory computer readable medium for implementing a method related to the installation and alignment of blockchain-enabled microwave antennas of claim 14, wherein the operations further comprise:

determining, using the A.I. module, third positional data comprising: a third latitude, a third longitude, a third altitude, a third vertical position, and a third horizontal position associated with the first microwave antenna, the third positional data corresponding to a target position of the first microwave antenna different from the first positional data; and determining, using the A.I. module, fourth positional data comprising: a fourth latitude, a fourth longitude, a fourth altitude, a fourth vertical position, and a fourth horizontal position associated with the second microwave antenna, the fourth positional data corresponding to a target position of the second microwave antenna different from the second positional data.

16. The non-transitory computer readable medium for implementing a method related to the installation and alignment of blockchain-enabled microwave antennas of claim 15, wherein the operations further comprise:

transferring, using at least one smart contract, the first positional data, the second positional data, the third positional data, and the fourth positional data to both the first microwave antenna and the second microwave antenna;

positioning the first antenna, using at the at least one motor of the first microwave antenna, according to the third positional data;

positioning the second antenna, using at the at least one motor of the second microwave antenna, according to the fourth positional data;

obtaining, using the first microwave antenna or the second microwave antenna, a second measured RSL corresponding to a signal level of a network link between the first microwave antenna and the second microwave antenna, wherein the signal level corresponds to the third and fourth positional data;

storing, in a computer memory, the second measured RSL in association with the third positional data, and the fourth positional data; and comparing the stored second measured RSL with the predetermined RSL to determine whether the first and second microwave antennas are in alignment.

17. The non-transitory computer readable medium for implementing a method related to the installation and alignment of blockchain-enabled microwave antennas of claim 16, wherein when the second measured RSL is greater than or equal to the predetermined RSL, the first microwave antenna and the second microwave antenna are determined to be in alignment, when the second measured RSL is less than the predetermined RSL, the first microwave antenna and the second microwave antenna are determined to be out of alignment, and the A.I. module continuously repositions and measures the RSL between the first and second microwave antennas until a measured RSL is greater than or equal to the predetermined RSL, and when the measured RSL is greater than or equal to the predetermined RSL, the positions of the first and second microwave antennas associated with the measured RSL are fixed and the first and second antennas are determined to be in alignment.

* * * * *